(12) United States Patent
Wu et al.

(10) Patent No.: US 11,321,541 B2
(45) Date of Patent: May 3, 2022

(54) RICH DESCRIPTOR FRAMEWORK TO TEXT GENERATION USING GRAPHS AND STRUCTURAL NEURAL ENCODERS

(71) Applicant: International Business Machines Corporation, Armonk, NY (US)

(72) Inventors: Lingfei Wu, Elmsford, NY (US); Chen Wang, Chappaqua, NY (US)

(73) Assignee: International Business Machines Corporation, Armonk, NY (US)

(*) Notice: Subject to any disclaimer, the term of this patent is extended or adjusted under 35 U.S.C. 154(b) by 147 days.

(21) Appl. No.: 16/919,208

(22) Filed: Jul. 2, 2020

(65) Prior Publication Data
US 2022/0004720 A1  Jan. 6, 2022

(51) Int. Cl.
| | | |
|---|---|---|
| G06F 40/58 | (2020.01) | |
| G06F 40/47 | (2020.01) | |
| G06F 16/901 | (2019.01) | |
| G06N 3/08 | (2006.01) | |
| G06F 16/332 | (2019.01) | |
| G06F 40/20 | (2020.01) | |
| G06N 3/04 | (2006.01) | |
| G06N 3/02 | (2006.01) | |

(52) U.S. Cl.
CPC .......... *G06F 40/58* (2020.01); *G06F 16/3329* (2019.01); *G06F 16/9024* (2019.01); *G06F 40/20* (2020.01); *G06F 40/47* (2020.01); *G06N 3/02* (2013.01); *G06N 3/04* (2013.01); *G06N 3/088* (2013.01)

(58) Field of Classification Search
CPC ... G06N 3/02; G06N 3/04; G06N 3/08; G06F 40/20; G06F 16/3329
See application file for complete search history.

(56) References Cited

U.S. PATENT DOCUMENTS

| | | |
|---|---|---|
| 10,628,743 B1 | 4/2020 | Kalukin |
| 2019/0325088 A1 | 10/2019 | Dubey |
| 2019/0325628 A1* | 10/2019 | Dubey ................ G06F 16/3329 |

FOREIGN PATENT DOCUMENTS

| | | |
|---|---|---|
| CN | 110600121 A | 12/2019 |
| EP | 3333771 A1 | 6/2018 |

OTHER PUBLICATIONS

Ferreira et al. "Neural data-to-text generation: A comparison between pipeline and end-to-end architectures." arXiv preprint arXiv: 1908. 09022 (Year: 2019).*

(Continued)

*Primary Examiner* — Samuel G Neway
(74) *Attorney, Agent, or Firm* — David B. Woycechowsky (57) ABSTRACT

Technology for using a bi-directed graph convolutional neural network ("BGCNN") to convert RDF data into natural language text. Some embodiments perform RDF-to-Text generation by learning graph-augmented structural neural encoders, consisting of: (a) bidirected graph-based metapaths encoder; (b) bidirected graph convolutional networks encoder, and (c) separated attention mechanism for combining encoders and decoder to translate RDF triplets to natural language description.

18 Claims, 6 Drawing Sheets

(56) References Cited

OTHER PUBLICATIONS

Amrutha C et al., "Profile Summarization from Semantic Data using Deep Neural Network Model," International Conference on Systems Energy and Environment (ICSEE 2019), Jul. 2019, <https://papers.ssrn.comsol3/papers.cfm?abstract_id=3437629>, 6 pages.

Bontcheva et al., "Automatic Report Generation from Ontologies: The MIAKT Approach," International Conference an Application of Natural Language to Information Systems, Springer, Berlin, Heidelberg, 2004, 12 pages.

Marcheggiani et al., "Deep Graph Convolutional Encoders for Structured Data to Text Generation", Proceedings of the 11th International Natural Language Generation Conference, pp. 1-9, Tilburg, The Netherlands, Nov. 5-8, 2018.

Perez-Beltrachini et al., "Building RDF Content for Data-to-Text Generation," The 26th International Conference on Computational Linguistics (COLING 2016), Dec. 2016, Osaka Japan, hal-01623800, 11 pages.

Ribeiro et al., "Modeling Global and Local Node Contexts for Text Generation from Knowledge Graphs," arXiv:2001.11003v1 [cs.CL] Jan. 29, 2020, 13 pages.

Trisedya et al., "GTR-LSTM: A Triple Encoder for Sentence Generation from RDF Data", Proceedings of the 56th Annual Meeting of the Association for Computational Linguistics (Long Papers), pp. 1627-1637, Melbourne, Australia, Jul. 15-20, 2018.

International Search Report and Written Opinion, International Application No. PCT/IB2021/055497, International filing date: Jun. 22, 2021.

\* cited by examiner

RICH DESCRIPTOR FRAMEWORK TO TEXT GENERATION USING GRAPHS AND STRUCTURAL NEURAL ENCODERS

BACKGROUND

The present invention relates generally to the field of the conversion of rich descriptor framework (RDF) data to text data using machine logic (for example, software).

The Wikipedia entry for "convolutional neural network" (as of 16 Jun. 2020) states, in part, as follows: "In deep learning, a convolutional neural network (CNN, or ConvNet) is a class of deep neural networks, most commonly applied to analyzing visual imagery. They are also known as shift invariant or space invariant artificial neural networks (SIANN), based on their shared-weights architecture and translation invariance characteristics. They have applications in . . . natural language processing . . . CNNs are regularized versions of multilayer perceptrons. Multilayer perceptrons usually mean fully connected networks, that is, each neuron in one layer is connected to all neurons in the next layer. The 'fully-connectedness' of these networks makes them prone to overfitting data. Typical ways of regularization include adding some form of magnitude measurement of weights to the loss function. CNNs take a different approach towards regularization: they take advantage of the hierarchical pattern in data and assemble more complex patterns using smaller and simpler patterns. Therefore, on the scale of connectedness and complexity, CNNs are on the lower extreme . . . . The name 'convolutional neural network' indicates that the network employs a mathematical operation called convolution. Convolution is a specialized kind of linear operation. Convolutional networks are simply neural networks that use convolution in place of general matrix multiplication in at least one of their layers . . . . A convolutional neural network consists of an input and an output layer, as well as multiple hidden layers. The hidden layers of a CNN typically consist of a series of convolutional layers that convolve with a multiplication or other dot product. The activation function is commonly a RELU layer, and is subsequently followed by additional convolutions such as pooling layers, fully connected layers and normalization layers, referred to as hidden layers because their inputs and outputs are masked by the activation function and final convolution. Though the layers are colloquially referred to as convolutions, this is only by convention. Mathematically, it is technically a sliding dot product or cross-correlation. This has significance for the indices in the matrix, in that it affects how weight is determined at a specific index point . . . . A convolutional layer within a neural network should have the following attributes: Convolutional kernels defined by a width and height (hyper-parameters). The number of input channels and output channels (hyper-parameter). The depth of the Convolution filter (the input channels) must be equal to the number channels (depth) of the input feature map . . . . The vector of weights and the bias are called filters and represent particular features of the input (e.g., a particular shape). A distinguishing feature of CNNs is that many neurons can share the same filter. This reduces memory footprint because a single bias and a single vector of weights are used across all receptive fields sharing that filter, as opposed to each receptive field having its own bias and vector weighting." (footnotes omitted)

The Wikipedia entry for "resource description framework" (as of 16 Jun. 2020) states, in part, as follows: "The Resource Description Framework (RDF) is a family of World Wide Web Consortium (W3C) specifications originally designed as a metadata data model. It has come to be used as a general method for conceptual description or modeling of information that is implemented in web resources, using a variety of syntax notations and data serialization formats. It is also used in knowledge management applications. The RDF data model is similar to classical conceptual modeling approaches (such as entity-relationship or class diagrams). It is based on the idea of making statements about resources (in particular web resources) in expressions of the form subject-predicate-object, known as triples. The subject denotes the resource, and the predicate denotes traits or aspects of the resource, and expresses a relationship between the subject and the object. For example, one way to represent the notion 'The sky has the color blue' in RDF is as the triple: a subject denoting 'the sky', a predicate denoting 'has the color', and an object denoting 'blue'. Therefore, RDF uses subject instead of object (or entity) in contrast to the typical approach of an entity-attribute-value model in object-oriented design: entity (sky), attribute (color), and value (blue). RDF is an abstract model with several serialization formats (i.e. file formats), so the particular encoding for resources or triples varies from format to format. A collection of RDF statements intrinsically represents a labeled, directed multi-graph . . . . RDF puts the information in a formal way that a machine can understand. The purpose of RDF is to provide an encoding and interpretation mechanism so that resources can be described in a way that particular software can understand it; in other words, so that software can access and use information that it otherwise couldn't use." (footnotes omitted)

The Wikipedia entry for "bidirected graph" (as of 16 Jun. 2020) states, in part, as follows: "In the mathematical domain of graph theory, a bidirected graph . . . is a graph in which each edge is given an independent orientation (or direction, or arrow) at each end. Thus, there are three kinds of bidirected edges: those where the arrows point outward, towards the vertices, at both ends; those where both arrows point inward, away from the vertices; and those in which one arrow points away from its vertex and towards the opposite end, while the other arrow points in the same direction as the first, away from the opposite end and towards its own vertex. Edges of these three types may be called, respectively, extraverted, introverted, and directed. The 'directed' edges are the same as ordinary directed edges in a directed graph; thus, a directed graph is a special kind of bidirected graph. It is sometimes desirable to have also edges with only one end (half-edges); these get only one arrow. An edge with no ends (a loose edge) has no arrows. The edges that are neither half nor loose edges may be called ordinary edges. A skew-symmetric graph is the double covering graph of a bidirected graph." (footnotes omitted)

A note on terminology: as is currently customary in the art, the terms "bidirected graph" and "bidirectional graph" mean the same thing and are used interchangeably.

SUMMARY

According to an aspect of the present invention, there is a method, computer program product and/or system that performs the following operations (not necessarily in the following order): (i) training a bi-directed graph convolutional neural network (BGCNN) using a plurality of training data sets; (ii) receiving an resource description framework (RDF) data set including computer readable corresponding to a plurality of RDF triples; (iii) creating, by machine logic, a bidirected graph data set that includes a bidirected graph inclusive of all of the information of the plurality of RDF triples; and (iv) translating, using the BGCNN, the bidirected graph into a piece of natural language text.

DETAILED DESCRIPTION

Some embodiments of the present invention are directed to using a bi-directed graph convolutional neural network ("BGCNN") to convert RDF data into natural language text. Some embodiments perform RDF-to-Text generation by learning graph-augmented structural neural encoders, consisting of: (a) bidirected graph-based meta-paths encoder; (b) bidirected graph convolutional networks encoder, and (c) separated attention mechanism for combining encoders and decoder to translate RDF triplets to natural language description.

This Detailed Description section is divided into the following subsections: (i) The Hardware and Software Environment; (ii) Example Embodiment; (iii) Further Comments and/or Embodiments; and (iv) Definitions.

I. The Hardware and Software Environment

The present invention may be a system, a method, and/or a computer program product at any possible technical detail level of integration. The computer program product may include a computer readable storage medium (or media) having computer readable program instructions thereon for causing a processor to carry out aspects of the present invention. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (for example, light pulses passing through a fiber-optic cable), or electrical signals transmitted through a wire.

A "storage device" is hereby defined to be anything made or adapted to store computer code in a manner so that the computer code can be accessed by a computer processor. A storage device typically includes a storage medium, which is the material in, or on, which the data of the computer code is stored. A single "storage device" may have: (i) multiple discrete portions that are spaced apart, or distributed (for example, a set of six solid state storage devices respectively located in six laptop computers that collectively store a single computer program); and/or (ii) may use multiple storage media (for example, a set of computer code that is partially stored in as magnetic domains in a computer's non-volatile storage and partially stored in a set of semiconductor switches in the computer's volatile memory). The term "storage medium" should be construed to cover situations where multiple different types of storage media are used.

Computer readable program instructions described herein can be downloaded to respective computing/processing devices from a computer readable storage medium or to an external computer or external storage device via a network, for example, the internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
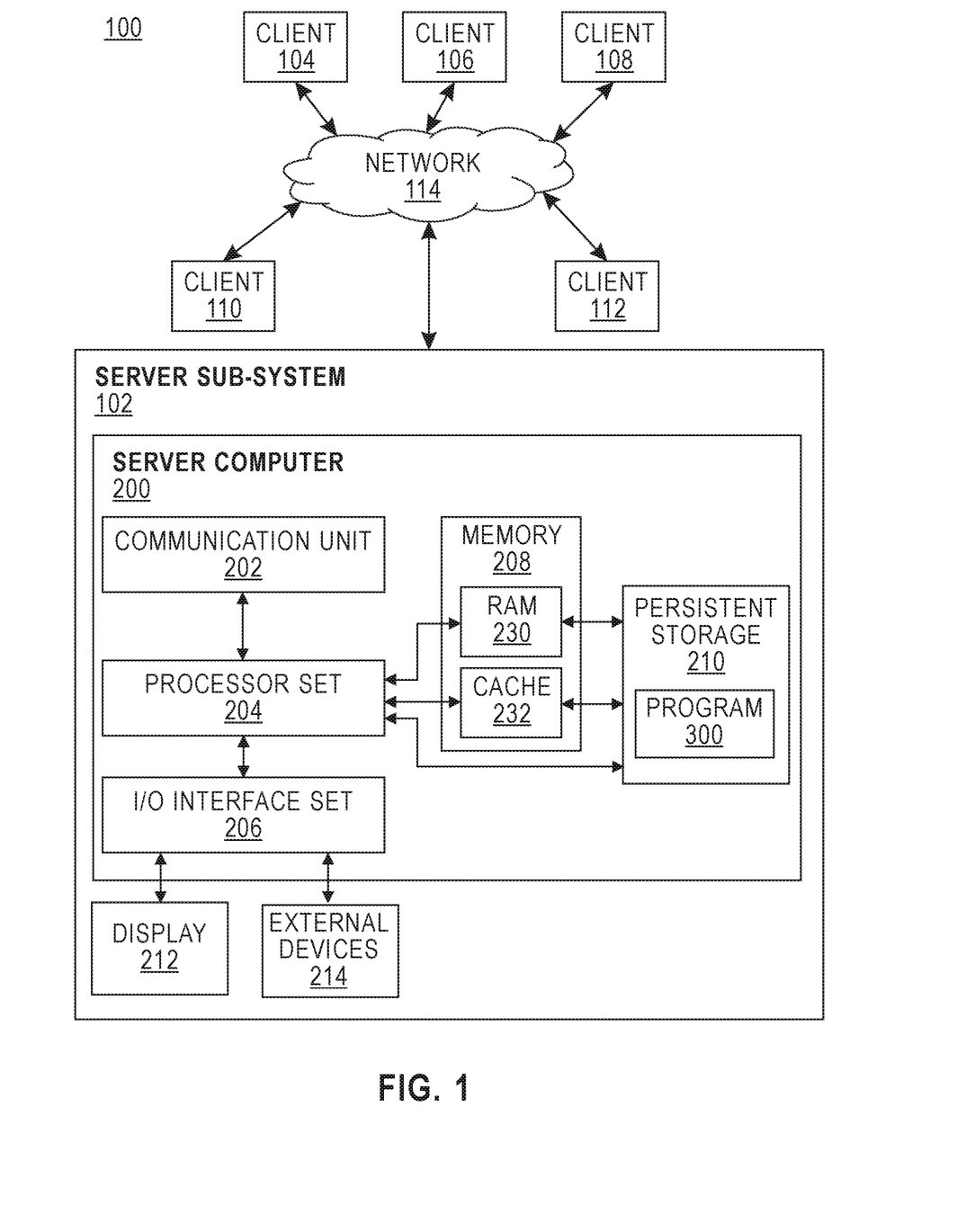
FIG. 1 is a block diagram of a first embodiment of a system according to the present invention.

As shown in FIG. 1, networked computers system 100 is an embodiment of a hardware and software environment for use with various embodiments of the present invention. Networked computers system 100 includes: server subsystem 102 (sometimes herein referred to, more simply, as subsystem 102); client subsystems 104, 106, 108, 110, 112; and communication network 114. Server subsystem 102 includes: server computer 200; communication unit 202; processor set 204; input/output (I/O) interface set 206; memory 208; persistent storage 210; display 212; external device(s) 214; random access memory (RAM) 230; cache 232; and program 300.

Subsystem 102 may be a laptop computer, tablet computer, netbook computer, personal computer (PC), a desktop computer, a personal digital assistant (PDA), a smart phone, or any other type of computer (see definition of "computer" in Definitions section, below). Program 300 is a collection of machine readable instructions and/or data that is used to create, manage and control certain software functions that will be discussed in detail, below, in the Example Embodiment subsection of this Detailed Description section.

Subsystem 102 is capable of communicating with other computer subsystems via communication network 114. Network 114 can be, for example, a local area network (LAN), a wide area network (WAN) such as the internet, or a combination of the two, and can include wired, wireless, or fiber optic connections. In general, network 114 can be any combination of connections and protocols that will support communications between server and client subsystems.

Subsystem 102 is shown as a block diagram with many double arrows. These double arrows (no separate reference numerals) represent a communications fabric, which provides communications between various components of subsystem 102. This communications fabric can be implemented with any architecture designed for passing data and/or control information between processors (such as microprocessors, communications and network processors, etc.), system memory, peripheral devices, and any other hardware components within a computer system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for subsystem 102; and/or (ii) devices external to subsystem 102 may be able to provide memory for subsystem 102. Both memory 208 and persistent storage 210: (i) store data in a manner that is less transient than a signal in transit; and (ii) store data on a tangible medium (such as magnetic or optical domains). In this embodiment, memory 208 is volatile storage, while persistent storage 210 provides nonvolatile storage. The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202 provides for communications with other data processing systems or devices external to subsystem 102. In these examples, communications unit 202 includes one or more network interface cards. Communications unit 202 may provide communications through the use of either or both physical and wireless communications links. Any software modules discussed herein may be downloaded to a persistent storage device (such as persistent storage 210) through a communications unit (such as communications unit 202).

I/O interface set 206 allows for input and output of data with other devices that may be connected locally in data communication with server computer 200. For example, I/O interface set 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, program 300, can be stored on such portable computer-readable storage media. I/O interface set 206 also connects in data communication with display 212. Display 212 is a display device that provides a mechanism to display data to a user and may be, for example, a computer monitor or a smart phone display screen.

In this embodiment, program 300 is stored in persistent storage 210 for access and/or execution by one or more computer processors of processor set 204, usually through one or more memories of memory 208. It will be understood by those of skill in the art that program 300 may be stored in a more highly distributed manner during its run time and/or when it is not running. Program 300 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

II. Example Embodiment

Figure 2:
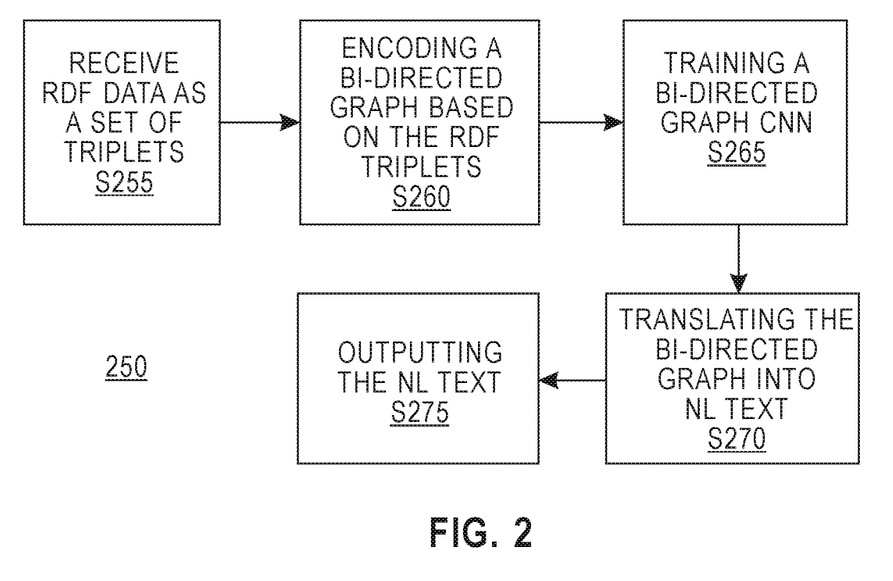
FIG. 2 is a flowchart showing a first embodiment method performed, at least in part, by the first embodiment system.
Figure 3:
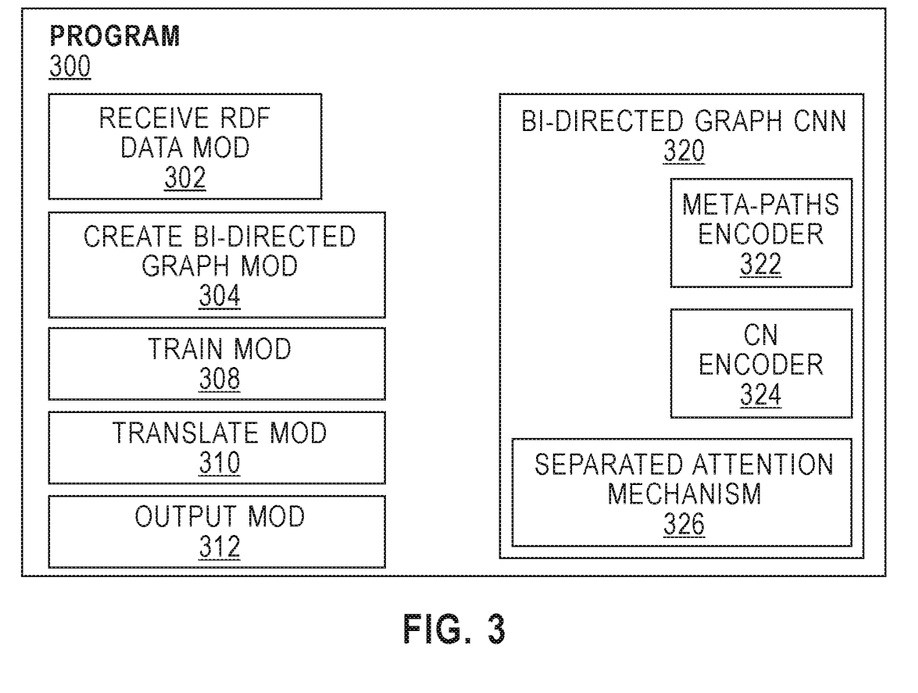
FIG. 3 is a block diagram showing a machine logic (for example, software) portion of the first embodiment system.

As shown in FIG. 1, networked computers system 100 is an environment in which an example method according to the present invention can be performed. As shown in FIG. 2, flowchart 250 shows an example method according to the present invention. As shown in FIG. 3, program 300 performs or controls performance of at least some of the method operations of flowchart 250. This method and associated software will now be discussed, over the course of the following paragraphs, with extensive reference to the blocks of FIGS. 1, 2 and 3.

Processing begins at operation S255, where receive RDF data module ("mod") 302 receives an RDF data set which is computer readable and includes information indicative of a set of RDF triples (or "triplets"). As shown in zone 402 of screenshot 400 of FIG. 4, there are three triples in this example as follows: (i) water includes atom(s) of oxygen; (ii) water is a species of molecule; and (iii) water includes atom(s) of hydrogen. The objective of the method of flowchart 250 is to generate, by machine logic, a natural language piece of text that communicates accurately all of the information of these triples, taken in the aggregate.

Processing proceeds to operation S260, where create bidirected graph mod 304 creates a bidirected graph based on the RDF data set. This is shown by zone 404 of screenshot 400 of FIG. 4. More specifically, the single bidirected graph of zone 404 is created by combining the three separate triple graphs of zone 402.

Processing proceeds to operation S265, where train mod 308 trains bidirected graph convolutional neural network (BGCNN) 320 using training data sets (not separately shown). As shown in FIG. 3, BGCNN 320 includes meta-paths encoder 322, convolutional network encoder 324 and separated attention mechanism 326. In the following sub-section of this Detailed Description section, a BGCNN will be discussed that also includes: (i) a bi-GMP (graph based meta-paths) encoder; (ii) a GCN (graph convolutional networks) encoder input; and (iii) a bi-GCN encoder.

Figure 4:
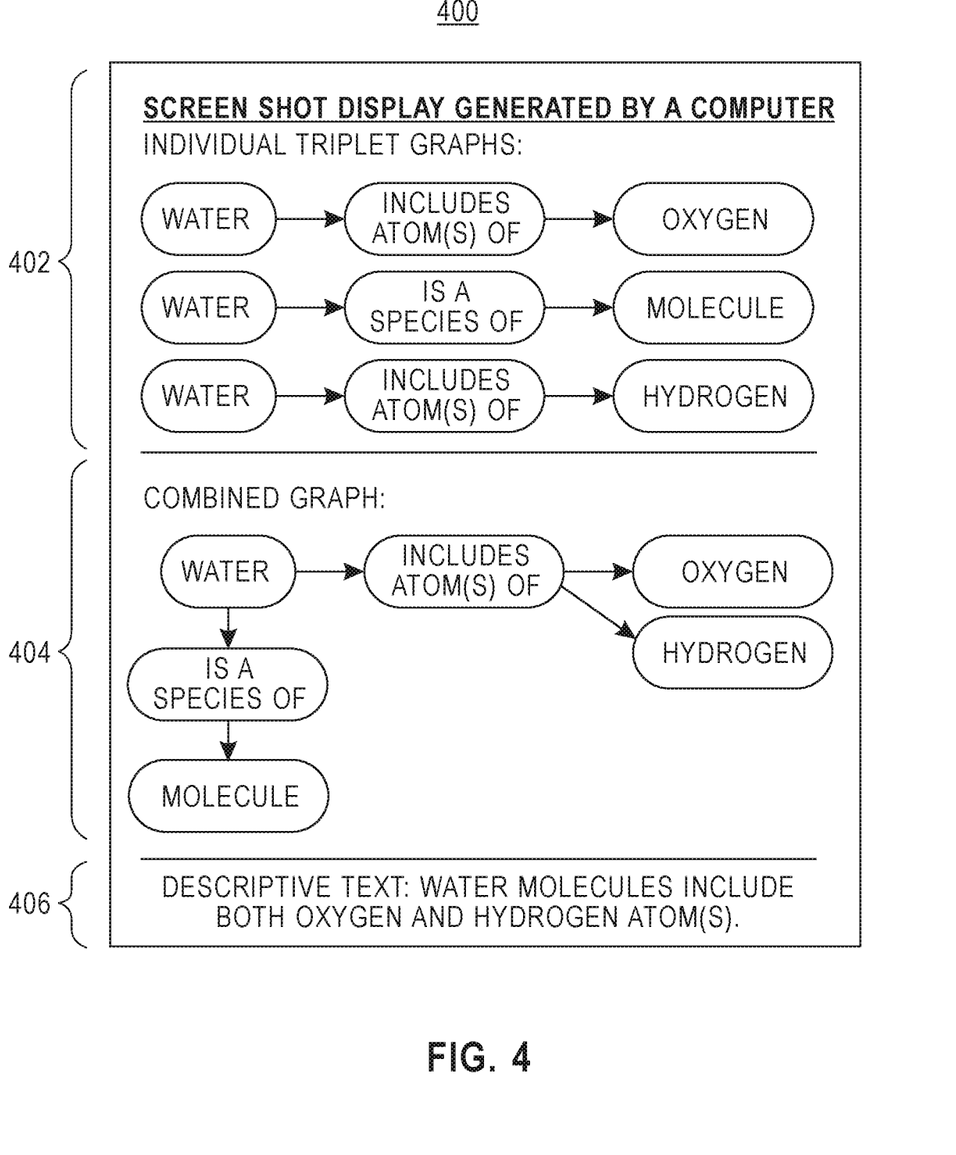
FIG. 4 is a screenshot view generated by the first embodiment system.
Figure 5A:
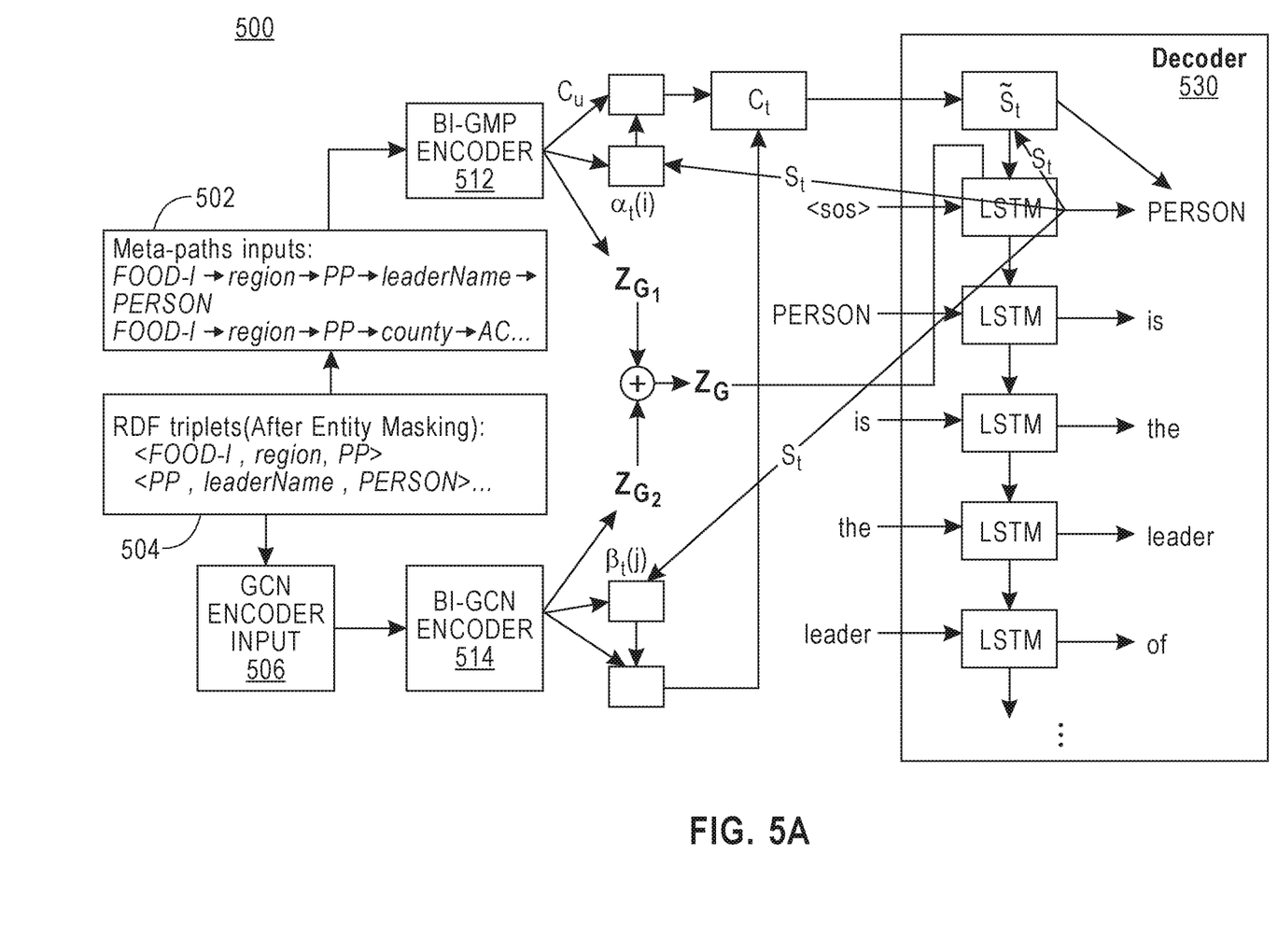
FIG. 5A is a block diagram of a second embodiment of a system according to the present invention.
Figure 5B:
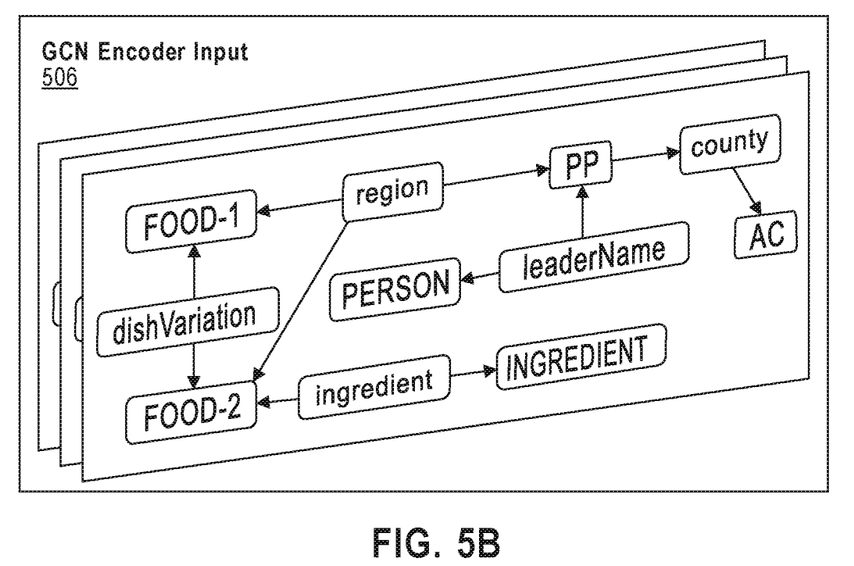
FIG. 5B is a block diagram of a portion of the second embodiment system.
Figure 5C:
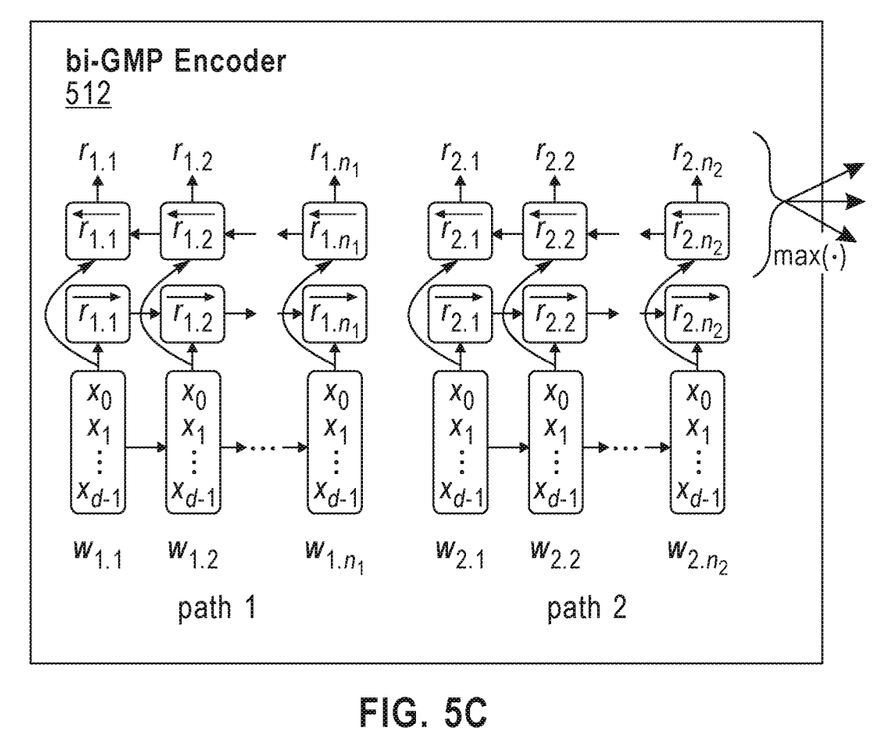
FIG. 5C is a block diagram of another portion of the second embodiment system.
Figure 5D:
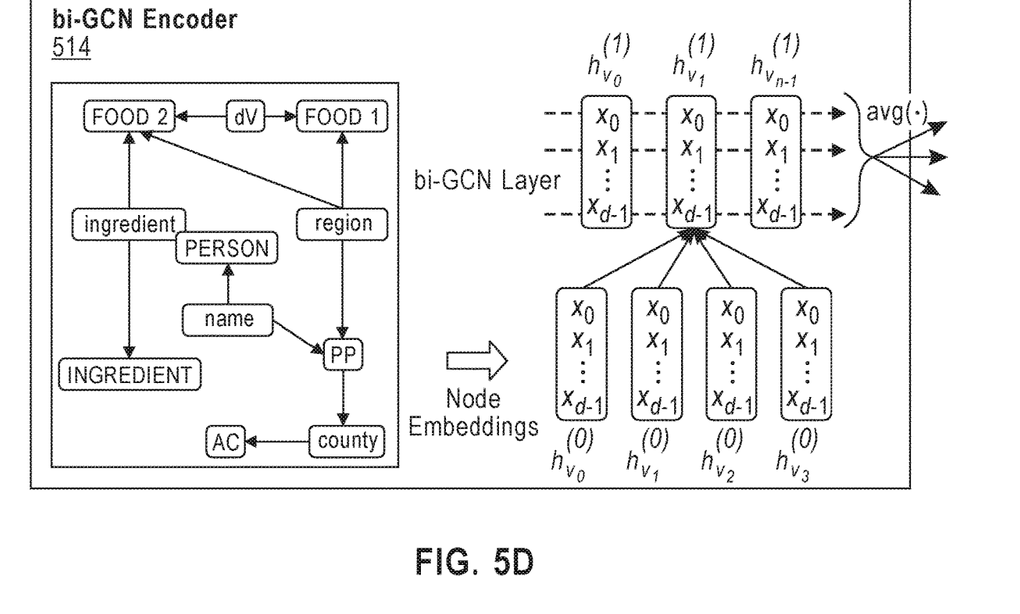
FIG. 5D is a block diagram of another portion of the second embodiment system.

Processing proceeds to operation S270, where translate mod 310 uses bidirected graph CNN 320 to translate the bidirected graph (shown at zone 404 of screen shot 400) to a piece of natural language text (shown at zone 406 of screen shot 400. More specifically, in this example, the translation operation includes three (3) sub-operations as follows: (i) using meta-paths encoder 322 to encode meta-paths (this is discussed in more detail in the following sub-section this Detailed Description section); (ii) using convolutional network (CN) encoder 324 to encode the bidirected graph (this is discussed in more detail in the following sub-section this Detailed Description section); and (iii) using separated attention mechanism 326 to combine encoders and decoders to translate RDF triples to natural language description (this is discussed in more detail in the following sub-section this Detailed Description section).

Processing proceeds to operation S275, where output mod 312 outputs the natural language text obtained at operation S265. In this example, the text is sent as a text message over communication network 114 to client subsystem 104 (which, in this example, is the smart phone of the chief chemist at the institute for advanced chemical studies). Alternatively or additionally, the natural language text could be sent as computer readable data to another computer device for storage and/or further processing.

III. Further Comments and/or Embodiments

Some embodiments of the present invention recognize that Natural Language Generation, Business Usage has application in many fields, such as the following: machine translation sequence, abstractive summarization sequence, image processing related fields, such as image captioning, table related fields, such as Wiki-infobox to biography and sports report generation, and graph related fields such as knowledge-based QA, and entity summarization.

Some embodiments of the present invention recognize one, or more, of the following facts, potential problems and/or potential areas for improvement with respect to the current state of the art: (i) one currently conventional solution for converting RDF data to text data is called GTR-LSTM1 (Graph-based TRiple-Long Short Term Memory); (ii) GTR-LSTM1 encodes global information by preserving graph structure; (iii) GTR-LSTM1 cannot capture rich local complex structure information between entities and relationships; (iv) another currently conventional solution for converting RDF data to text data is called Modified Graph Convolutional Networks (DGCN) 2; (v) Modified Graph Convolutional Networks (DGCN) 2 performs better on capturing local structure information; (vi) Modified Graph Convolutional Networks (DGCN) 2 is easily overfitted when GCN layers have a quantity that is greater than or equal to three (3); and/or (vii) Modified Graph Convolutional Networks (DGCN) 2 fails to capture long-range dependency (global) information between the RDF triples.

Some embodiments of the present invention may include one, or more, of the following operations, features, characteristics and/or advantages: (i) performs RDF-to-Text Generation with Graph-augmented Structural Neural Encoders; (ii) Combine Graph Encoder plus Graph-based Meta-paths Encoder; (iii) Graph Constructions; (iv) bidirectional Graph-based Meta-Paths Encoder; (v) bidirectional Graph Convolutional Networks Encoder; and/or (vi) Combining Encoders and Decoder.

Some embodiments of the present invention may include one, or more, of the following operations, features, characteristics and/or advantages: (i) performs RDF-to-Text generation by learning graph-augmented structural neural encoders; (ii) includes operations performed by the Bidirectional Graph-based Meta-Paths Encoder; (iii) includes operations performed by a Bidirectional Graph Convolutional Networks Encoder; and/or (iv) Combining Encoders and Decoder with separated attention mechanism for translating RDF triplets to respectively corresponding natural language descriptions.

A method, according to an embodiment of the present invention, utilizes a computing device to generate a natural language description from resource description framework data. This method includes the following operations (not necessarily in the following order): (i) receiving by a computing device resource description framework data, the resource description framework data represented as a directed graph; (ii) encoding by the computing device a bidirectional graph based upon the resource description framework data; (iii) training by the computing device a bidirectional graph convolutional neural network; and (iv) utilizing by the computing device the bidirectional graph convolutional neural network to translate the resource description framework data into a natural language description.

Some embodiments of the present invention may include one, or more, of the following operations, features, characteristics and/or advantages: (i) jointly learns, by machine learning, local and global structure information via combining two new graph-augmented structural neural encoders (that is, a bidirectional graph encoder and a bidirectional graph-based meta-paths encoder) for the input triples; (ii) a graph-based meta-paths encoder captures global structural information; (iii) faithfully generates the natural language utterance (the meaning) from the subgraph of a knowledge graph; (iv) uses much advanced techniques by jointly learning local and global structure information via combining two new graph-augmented structural neural encoders; (v) directly performs RDF-to-text generation in Knowledge Graph; and/or (vi) uses advanced deep learning-based methods, which could be used for any system.

For purposes of this document, "RDF-to-Text Generation" is hereby defined as: generation, by machine logic running on a set of computer(s), a descriptive text given a set of RDF triplet(s), where: (i) the input is computer code including information indicative of a set of RDF triplet(s); and (ii) the output is computer code indicative of a piece of descriptive natural language text.

An example input set of triplets is as follows:
<Denmark, leaderName, Lars Løkke Rasmussen>
<European University Association, headquarters, Brussels>
<School of Business and Social Sciences at the Aarhus University, country, Denmark>
<Denmark, leaderTitle, Monarchy of Denmark>
<School of Business and Social Sciences at the Aarhus University, affiliation, European University Association>
<Denmark, religion, Church of Denmark>
<Brussels, capital of, Belgium>

An example output of a piece of descriptive natural language text, resulting from processing the inputs set forth in the previous paragraph, is as follows: "The school of business and social sciences at the Aarhus University in Denmark is affiliated with the European University Association. The European University Association is headquartered in Brussels. Brussels is the capital of Belgium. Denmark has a monarch; its religion is the church of Denmark; and its leader is Lars Lake Rasmussen."

Formulation of RDF-to-Text Generation will now be discussed. A set of RDF triplets is mathematically represented as follows: $S=\{t\_1, t\_(2), \ldots t\_n\}$ where $t\_i=<s\_i, r\_i \llbracket, o \rrbracket \_i>$. S is represented as a directed graph whose mathematical expression is as follows: $G=<V,E>$, Real target text is mathematically represented as follows: $Y=\{w\_1, w\_(2), \ldots w\_T\}$. In performing the RDF-to-text generation task, machine logic running on a computer generates the descriptive text $\hat{Y}$ given a set of RDF triplets S or its corresponding graph G.

Challenges in RDF-to-Text Generation and motivation for RDF-to-Text Generation will now be discussed. In some embodiments, better use is made of structure information formed in a set of RDF triplets S by using a reasonable model that has the following characteristics: (i) predicts local entity and its attributes accurately (within a triplet/local); and (ii) fully covers global the input information (between triplets/global). Some embodiments combine graph-augmented structural neural encoders (specifically, a graph encoder and a graph-based meta-paths encoder) to jointly learn local and global structure information. As shown in FIGS. 5A to 5D, diagram 500 (including meta-paths inputs block 502, RDF triplets block 504, GCN (graph convolutional network) encoder input 506, bi-GMP encoder 512, bi-GCN encoder 514 and decoder 530) represents a framework of the combined graph-augmented structural neural encoders model.

Figure 6:
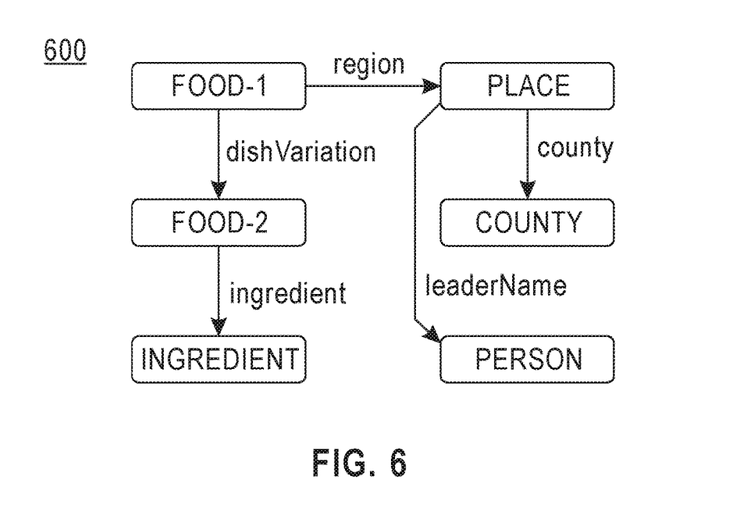
FIG. 6 is a bidirected graph diagram generated by the second embodiment system.

The process of graph construction, according to an embodiment of the present invention, will now be discussed. Entity masking improves the generalization ability of the model. In an example: (i) "Bakewell pudding" (FOOD-1) leads to "ENTITY-1 FOOD": and (ii) "Bakewell tart" (FOOD-2) leads to "entity-2 FOOD". "Relations" are seen as additional nodes. The received RDF triplets are converted into a graph data structure. In this example, a bi-GCN input of (FOOD-1, region, PLACE) leads to region being associated with FOOD-1 and also with region being associated with PLACE. In this example, topological sort and single-source shortest path analysis are performed on the bi-GMP input to yield the following three results: (i) FOOD1→region→PLACE→leaderName→PERSON; (ii) FOOD-1→region→PLACE→county→COUNTY; and (iii) FOOD-1→dishVariation→FOOD-2→ingredient→INGREDIENT. The graph that is jointly constructed by the bi-GCN and bi-GMP encoders is shown at graph 600 of FIG. 6.

In some embodiments, the bi-directional graph-based meta-paths encoder has one, or more, of the following characteristics: (i) input graph G1 is transformed to a sequence composed of a set of meta-paths S_p={p_1, p_2, ... }, p_k=<w_(k,1),w_(k,2), ..., w(k,n_k)>; (ii) the representation r_i of each token in each meta-path is computed according to mathematical expression (1) (see below); (iii) hidden state masking between different meta-paths; (iv) r_(i−1) is an all-zero vector or previous time-step hidden state in the meta-path; (v) f(•) and g(•) are single LSTM (Long Short Term Memory) units; (vi) copy mechanism is introduced; (vii) output: a set of representations R_1={r_1, r_2 ... }; and/or (viii) the graph embedding of graph G1 is given by mathematical expression (2) (see below).

Mathematical expressions (1) and (2) (see above) are as follows:

$$\vec{r}_i = f(\overrightarrow{r_{i-1}}, w_i) \text{ and } \overleftarrow{r}_i = g(\overleftarrow{r_{i-1}}, w_i)$$

$$r_i = CONCAT(\vec{r}_i, \overleftarrow{r}_i) \quad \text{(Ex. 1)}$$

$$Z_{G_1} = \text{maxpool}(R_1). \quad \text{(Ex. 2)}$$

In some embodiments, the bi-directional graph-based convolutional networks encoder has one, or more of the following characteristics: (i) The vector representations H^((l))={h_(v_0)^((l)),h_(v_1)^((l)), ... }∈ℝ^(D×V) at layer l (see mathematical expression (3), below); (ii) mathematical expression (4) (see below) denotes the source-to-target and target-to-source adjacency matrices of the directed graph G2 with inserted self-loops given by mathematical expression (5) (see below); (iii) I is an identity matrix given by mathematical expression (6); (iv) output: a set of entity and relationship node representations; (v) the graph embedding of graph G2 is shown by mathematical expression (7) (see below); and/or (vi) φ(•) is a single-layer perceptron.

Mathematical expressions (3) to (7) (see above) are as follows:

$$H_{\rightarrow}^{(l)} = \hat{D}_{\rightarrow}^{-1/2} \hat{A}_{\rightarrow} \hat{D}_{\rightarrow}^{-1/2} H^{(l-1)} W_{1\rightarrow}^{(l-1)}$$

$$H_{\leftarrow}^{(l)} = \hat{D}_{\leftarrow}^{-1/2} \hat{A}_{\leftarrow} \hat{D}_{\leftarrow}^{-1/2} H^{(l-1)} W_{1\leftarrow}^{(l-1)}$$

$$H^{(l)} \sigma(CONCAT(H_{\rightarrow}^{(l)}, H_{\leftarrow}^{(l)}) W_f) \quad \text{(Ex. 3)}$$

$$\hat{A}_{\rightarrow} = A_{\rightarrow} + I, \hat{A}_{\leftarrow} = A_{\leftarrow} + I \quad \text{(Ex. 4)}$$

$$R_2 = H^{(L)} \quad \text{(Ex. 5)}$$

$$\hat{D}_{ii} = \Sigma_{j=0} \hat{A}_{ij} \quad \text{(Ex. 6)}$$

$$Z_{G_2} = \varphi(\text{avgpool}(R_2)) \quad \text{(Ex. 7)}$$

Combining the encoders and decoder will now be discussed: The combined graph embedding is represented by mathematical expression (8):

$$Z\_G : Z\_G = Z\_(G\_1) \oplus Z\_(G\_2) \quad \text{(Ex. 8)}$$

Apply the separate attentions on R_1 and R_2 at time step t is given by the following mathematical expressions (9) and (10):

$$\alpha_{t(i)} = \frac{\exp(\text{score}(r_i, s_t))}{\exp\left(\sum_{k=1}^{M} \text{score}(r_k, s_t)\right)}, \quad \text{(Ex. 9)}$$

$$\beta_{t(j)} = \frac{\exp(\text{score}(h_j, s_t))}{\exp\left(\sum_{k=1}^{V} \text{score}(h_k, s_t)\right)}$$

$$\{r\_i \in R\}\_1, \{h\_j \in R\}\_2, \{M = |R|\_1|, \{V = |R|\_2| \quad \text{(Ex. 10)}$$

Bi-GMP level context vector c_u and bi-GCN level context vector c_v is given by the following mathematical expression (11):

$$c_u = \Sigma_{i=1}^{M} \alpha_{t(i)} r_i \text{ and } c_v = \Sigma_{j=1}^{V} \beta_{t(j)} h_j \quad \text{(Ex. 11)}$$

The final attentional hidden state is given by the following mathematical expression (12):

$$\tilde{s}_t = \tan h(W_c[c_u; c_v; s_t] + b) \quad \text{(Ex. 12)}$$

The Objective Function is given by the following mathematical expression (13):

$$L_G = \frac{1}{T} \sum_{t=1}^{T} -\log P(y_t | y_{0:t-1}) \quad \text{(Ex. 13)}$$

IV. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Including/include/includes: unless otherwise explicitly noted, means "including but not necessarily limited to."

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

What is claimed is:

1. A computer-implemented method (CIM) comprising:
   training a bi-directed graph convolutional neural network (BGCNN) using a plurality of training data sets;
   receiving a resource description framework (RDF) data set including computer readable information corresponding to a plurality of RDF triples;
   creating, by machine logic, a bidirected graph data set that includes a bidirected graph inclusive of all of the information of the plurality of RDF triples; and
   translating, using the BGCNN, the bidirected graph into a piece of natural language text.

2. The CIM of claim 1 wherein the training includes at least one of the following: supervised learning and/or unsupervised learning.

3. The CIM of claim 1 wherein the translation of the bidirected graph into a piece of natural language text includes the following sub-operation:
   encoding, by a meta-paths encoder module of the BGCNN, meta-paths associated with the bidirected graph.

4. The CIM of claim 3 wherein the translation of the bidirected graph into a piece of natural language text includes the following sub-operation:
   encoding, by a convolutional network (CN) encoder portion of the BGCNN, the bidirected graph.

5. The CIM of claim 4 wherein the translation of the bidirected graph into a piece of natural language text includes the following sub-operation:
   combining, by a separated attention mechanism portion of the BGCNN, at least one encoder and at least one decoder to translate the RDF data set to the piece of natural language text.

6. The CIM of claim 1 wherein the BGCNN includes:
   a bi-graph-based-meta-paths encoder;
   a graph convolutional network encoder input; and
   a bi-graph-convolutional-network encoder.

7. A computer program product (CPP) comprising:
   a set of at least one storage devices; and
   computer code stored collectively in the set of storage devices, with the computer code including data and instructions to cause a processor set to perform at least the following operations:
      training a bi-directed graph convolutional neural network (BGCNN) using a plurality of training data sets,
      receiving a resource description framework (RDF) data set including computer readable information corresponding to a plurality of RDF triples,
      creating, by machine logic, a bidirected graph data set that includes a bidirected graph inclusive of all of the information of the plurality of RDF triples, and
      translating, using the BGCNN, the bidirected graph into a piece of natural language text.

8. The CPP of claim 7 wherein the training includes at least one of the following: supervised learning and/or unsupervised learning.

9. The CPP of claim 7 wherein the translation of the bidirected graph into a piece of natural language text includes the following sub-operation:
   encoding, by a meta-paths encoder module of the BGCNN, meta-paths associated with the bidirected graph.

10. The CPP of claim 9 wherein the translation of the bidirected graph into a piece of natural language text includes the following sub-operation:
    encoding, by a convolutional network (CN) encoder portion of the BGCNN, the bidirected graph.

11. The CPP of claim 10 wherein the translation of the bidirected graph into a piece of natural language text includes the following sub-operation:
    combining, by a separated attention mechanism portion of the BGCNN, at least one encoder and at least one decoder to translate the RDF data set to the piece of natural language text.

12. The CPP of claim 7 wherein the BGCNN includes:
    a bi-graph-based-meta-paths encoder;
    a graph convolutional network encoder input; and
    a bi-graph-convolutional-network encoder.

13. A computer system (CS) comprising:
    a processor set;
    a set of at least one storage device; and
    computer code stored collectively in the set of at least one storage device, with the computer code including data and instructions to cause the processor set to perform at least the following operations:
       training a bi-directed graph convolutional neural network (BGCNN) using a plurality of training data sets,
       receiving a resource description framework (RDF) data set including computer readable information corresponding to a plurality of RDF triples,
       creating, by machine logic, a bidirected graph data set that includes a bidirected graph inclusive of all of the information of the plurality of RDF triples, and
       translating, using the BGCNN, the bidirected graph into a piece of natural language text.

14. The CS of claim 13 wherein the training includes at least one of the following: supervised learning and/or unsupervised learning.

15. The CS of claim 13 wherein the translation of the bidirected graph into a piece of natural language text includes the following sub-operation:
    encoding, by a meta-paths encoder module of the BGCNN, meta-paths associated with the bidirected graph.

16. The CS of claim 15 wherein the translation of the bidirected graph into a piece of natural language text includes the following sub-operation:
    encoding, by a convolutional network (CN) encoder portion of the BGCNN, the bidirected graph.

17. The CS of claim 16 wherein the translation of the bidirected graph into a piece of natural language text includes the following sub-operation:
    combining, by a separated attention mechanism portion of the BGCNN, at least one encoder and at least one decoder to translate the RDF data set to the piece of natural language text.

18. The CS of claim 13 wherein the BGCNN includes:
    a bi-graph-based-meta-paths encoder;
    a graph convolutional network encoder input; and
    a bi-graph-convolutional-network encoder.

* * * * *